US008761712B1

(12) United States Patent
Howard

(10) Patent No.: US 8,761,712 B1
(45) Date of Patent: Jun. 24, 2014

(54) LOCATION BASED REMOTE CONTROLLER FOR CONTROLLING DIFFERENT ELECTRONIC DEVICES LOCATED IN DIFFERENT LOCATIONS

(75) Inventor: Michael L. Howard, Renton, WA (US)

(73) Assignee: Control4 Corporation, Salt Lake City, UT (US)

( * ) Notice: Subject to any disclaimer, the term of this patent is extended or adjusted under 35 U.S.C. 154(b) by 847 days.

(21) Appl. No.: 11/626,221

(22) Filed: Jan. 23, 2007

(51) Int. Cl.

| | |
|---|---|
| ***H04H 40/00*** | (2008.01) |
| ***H04B 7/00*** | (2006.01) |
| ***H04M 1/66*** | (2006.01) |
| ***H04M 3/00*** | (2006.01) |
| ***H04B 1/06*** | (2006.01) |
| ***G08C 19/16*** | (2006.01) |
| ***H04N 7/14*** | (2006.01) |

(52) U.S. Cl.
USPC ......... 455/352; 455/3.06; 455/41.3; 455/411; 455/420; 348/14.05; 340/12.22

(58) Field of Classification Search
USPC ............. 455/3.03, 3.06, 41.2–41.3, 352–353, 455/355, 410–411, 418–420, 500, 507; 340/5.6–5.61, 5.64, 5.8, 12.22, 12.29; 348/14.03–14.05; 380/258, 270–271
See application file for complete search history.

(56) References Cited

U.S. PATENT DOCUMENTS

| | | | | |
|---|---|---|---|---|
| 4,860,380 | A | 8/1989 | Mengel | |
| 4,866,434 | A | 9/1989 | Keenan | |
| 4,959,810 | A | 9/1990 | Darbee et al. | |
| 5,515,052 | A * | 5/1996 | Darbee | 341/176 |
| 5,663,716 | A * | 9/1997 | Miwa et al. | 340/2.4 |
| 5,870,380 | A * | 2/1999 | Diehl et al. | 370/212 |
| 6,127,941 | A * | 10/2000 | Van Ryzin | 340/4.37 |
| 6,400,956 | B1 * | 6/2002 | Richton | 455/456.3 |
| 6,437,692 | B1 * | 8/2002 | Petite et al. | 340/540 |
| 6,496,862 | B1 * | 12/2002 | Akatsu et al. | 709/224 |
| 6,563,430 | B1 * | 5/2003 | Kemink et al. | 340/8.1 |
| 6,864,778 | B2 * | 3/2005 | Musschebroeck et al. | 340/3.41 |
| 6,907,301 | B2 * | 6/2005 | Kou et al. | 700/19 |
| 6,907,458 | B2 * | 6/2005 | Tomassetti et al. | 709/223 |
| 6,941,340 | B2 * | 9/2005 | Kim et al. | 709/203 |
| 6,943,681 | B2 * | 9/2005 | Rezvani et al. | 340/506 |
| 7,295,252 | B2 * | 11/2007 | Watanabe et al. | 348/734 |
| 7,363,028 | B2 * | 4/2008 | de Clerq et al. | 455/414.1 |
| 7,973,647 | B2 * | 7/2011 | Elberbaum | 340/13.24 |
| 2002/0125998 | A1 * | 9/2002 | Petite et al. | 340/286.01 |
| 2003/0014766 | A1 * | 1/2003 | Dinwiddie et al. | 725/126 |
| 2003/0018757 | A1 * | 1/2003 | Saito et al. | 709/220 |
| 2003/0105854 | A1 * | 6/2003 | Thorsteinsson et al. | 709/223 |
| 2003/0197595 | A1 * | 10/2003 | Olson et al. | 340/5.61 |
| 2003/0231131 | A1 * | 12/2003 | Dimig et al. | 341/176 |
| 2004/0003257 | A1 * | 1/2004 | Mitchell | 713/182 |
| 2004/0148632 | A1 * | 7/2004 | Park et al. | 725/81 |
| 2004/0203387 | A1 * | 10/2004 | Grannan | 455/41.2 |
| 2004/0215816 | A1 * | 10/2004 | Hayes et al. | 709/238 |
| 2005/0027794 | A1 * | 2/2005 | Decker | 709/201 |
| 2005/0035846 | A1 * | 2/2005 | Zigmond et al. | 340/5.22 |
| 2005/0055472 | A1 * | 3/2005 | Krzyzanowski et al. | 710/5 |
| 2005/0096753 | A1 * | 5/2005 | Arling et al. | 700/11 |
| 2006/0181390 | A1 * | 8/2006 | Zigmond et al. | 340/5.22 |

(Continued)

*Primary Examiner* — Meless Zewdu
(74) *Attorney, Agent, or Firm* — Austin Rapp & Hardman

(57) ABSTRACT

A method for roaming control of nodes at multiple locations is described. The method may include various elements. The method may include identifying a first location. The method may include mapping a control function based on the first location. The method may include communicating with a first node at the first location.

23 Claims, 10 Drawing Sheets

(56) References Cited

U.S. PATENT DOCUMENTS

2006/0288370 A1* 12/2006 Rothschild ...................... 725/51
2007/0136778 A1* 6/2007 Birger et al. .................. 725/117
2007/0139214 A1* 6/2007 Andersen et al. ........ 340/825.69
2007/0171091 A1* 7/2007 Nisenboim et al. ...... 340/825.69
2008/0079604 A1* 4/2008 Madonna et al. ........ 340/825.72

* cited by examiner

LOCATION BASED REMOTE CONTROLLER FOR CONTROLLING DIFFERENT ELECTRONIC DEVICES LOCATED IN DIFFERENT LOCATIONS

TECHNICAL FIELD

The present invention relates generally to computers and computer-related technology. More specifically, the present invention relates to systems and methods for providing roaming control of nodes at multiple locations.

BACKGROUND

The price of electronic devices has continued to decrease dramatically. In addition, the types of electronic components that can be purchased have continued to increase. For example, DVD players, large screen TVs, multi-carousel CD and DVD players, MP3 players, video game consoles, and similar consumer electronic items have become more widely available while continuing to drop in price.

The decreasing prices and increasing types of electronic components has packed today's homes and businesses with modern conveniences. Yet as these conveniences grow in number and sophistication, they also become more difficult to manage and control. Typical homes and businesses may include from three to more than seven remote controls to manage the various electronic devices.

Universal remote controls were developed to attempt to minimize the number of remote controls needed to control all of the electronic devices found in a typical location. However, universal remote controls generally did not allow for control of electronic devices that do not typically come with a remote control, such as fireplaces, doors, window blinds, or other electronic devices.

In recent years, automation systems have emerged to help manage and control the myriad devices found in modern buildings. Automation systems may allow a user to control nearly all of the electronic devices in the location.

With the affordability of new technology, the number of electronic devices in buildings and at other locations has continued to steadily increase. Property owners now desire more customizable systems and features in their systems. With more customizations and features, property owners may also desire systems and methods for providing roaming control of electronic devices at multiple locations.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
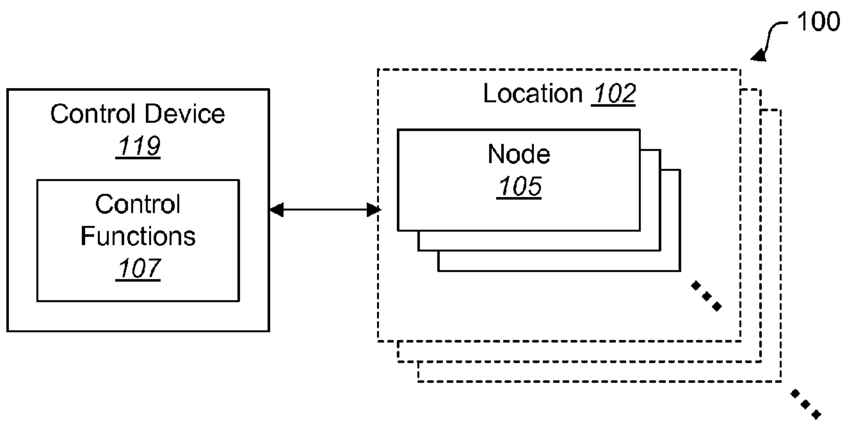
FIG. 1 is a block diagram illustrating an embodiment of a system for providing roaming control of devices at multiple locations.

A method for roaming control of nodes at multiple locations is described. The method includes identifying a first location. A control function is mapped based on the first location. The method includes communicating with a first node at the first location.

A system that is configured for roaming control of nodes at multiple locations is also described. The system includes a control device. The control device includes a processor. The control device includes memory in electronic communication with the processor. Instructions are stored in the memory. The instructions are executable to identify a first location. The instructions are also executable to map control functions based on the first location. The instructions are further executable to communicate with a first node at the first location.

A system that is configured for roaming control of nodes at multiple locations is described. The system includes a control system. The system also includes a control device that is in electronic communication with the control system. The control device includes a processor. The control device also includes memory in electronic communication with the processor. Instructions are stored in the memory. The instructions are executable to identify a first location. The instructions are also executable to map control functions based on the first location. The instructions are further executable to communicate with a first node at the first location.

In some embodiments, identifying the first location includes the control device identifying the first location. In other embodiments identifying the first location includes a control system identifying that the control device is at the first location. In further embodiments, identifying the first location includes determining the ability of the control device to control the first node at the first location.

In some embodiments, communicating with the first node at the first location includes controlling the first node at the first location using the mapped control functions. In further embodiments, controlling the first node at the first location includes controlling the first node over a wireless network. In still further embodiments, the wireless network is selected from the group consisting of: an infrared network, a ZigBee network, or a WiFi network.

In some embodiments, a second location is identified, the control function is mapped based on the second location, and a second node at the second location is communicated with. In further embodiments, a first key is used to communicate with the first node at the first location and a second key is used to communicate with the second node at the second location. In still further embodiments, the control system is a site controller and the site controller includes an embedded system that includes built-in audio ports, built-in video ports, and built-in infrared in and out ports and wherein the site controller does not require an external exclusive computer monitor for standard operation.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments of the disclosed invention(s)," unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

FIG. 1 is a block diagram illustrating an embodiment of a system 100 for providing roaming control of nodes 105 at multiple locations. A node 105 is an electronic device with which a control device 119 may communicate. The system 100 may include a control device 119 and multiple locations 102. The locations 102 may include nodes 105. The control device 119 may be in electronic communication with the various nodes 105 at the various locations 102.

The control device 119 may communicate with the nodes 105 in the various locations 102. In some embodiments, the control device 119 may control the nodes 105 at the various locations 102. The control device 119 may be used to identify the various locations 102.

The control device 119 may include control functions 107. The control functions 107 may be mapped based on the location 102 in which the control device 119 is located. In the present embodiment, the control device 119 may communicate with and/or control the nodes 105 via the control functions 107.

Figure 2:
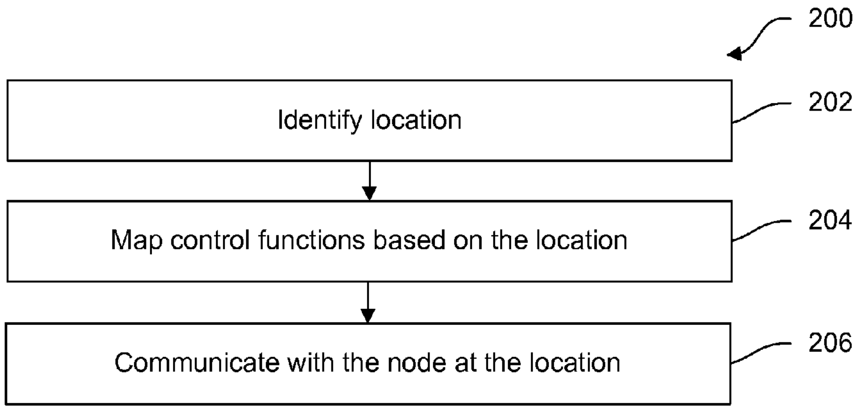
FIG. 2 is a flow diagram of an embodiment of a method for providing roaming control of devices at multiple locations.

FIG. 2 is a flow diagram of an embodiment of a method 200 for providing roaming control of nodes 105 at multiple locations 102. The method 200 may include identifying 202 a location 102. The location 102 may include a particular physical location. For example, the location 102 may have spatial significance and/or may include at least one node 105 with which the control device 119 may communicate.

The method 200 may include mapping 204 control functions 107 based on the location 102. Mapping 204 control functions 107 may include mapping an I/O interface. Mapping 204 control functions 107 may include mapping the control functions 107 to communicate with and/or control nodes 105 in the location 102 in which the control device 119 is presently located.

Mapping 204 control functions 107 may include mapping an action specified by the control device 119 to different actions based on the location 102. For example, if a user initiates a control function 107 on the control device 119 in a first location 102 that would normally change the channel on a television in a second location 102, the control function 107 may be mapped 204 to perform a different action in the first location 102 than the second location 102, such as change the channel on a radio tuner in the first location 102, because the control device 119 is located in the first location 102 not the second location 102.

The method 200 may include communicating 206 with the node 105 at the location 102. In the present embodiment, the control device 119 may communicate 206 with the node 105 at the location 102. Communicating 206 with the node 105 at the location 102 may include controlling the node 105. In some embodiments, communicating 206 with the node 105 at the location 102 may include communicating with a control system.

Figure 3:
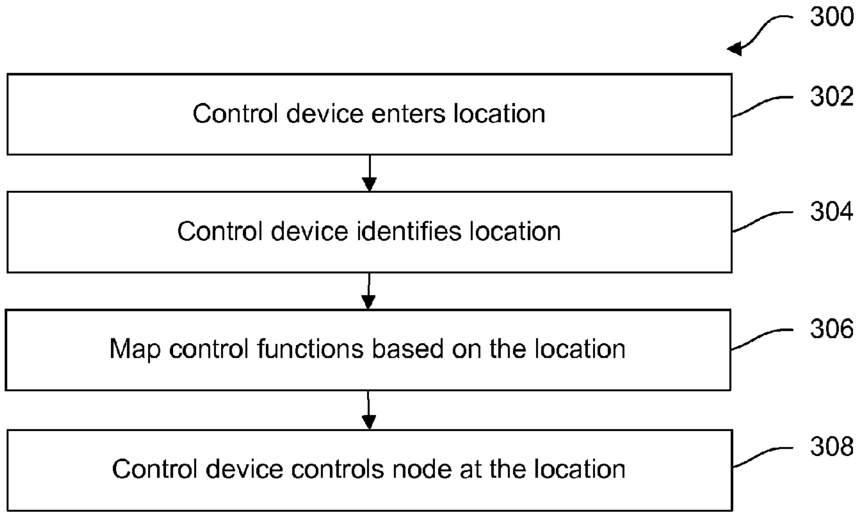
FIG. 3 is a flow diagram of an embodiment of a method for providing roaming control of devices at multiple locations.

FIG. 3 is a flow diagram of another embodiment of a method 300 for providing roaming control of nodes 105 at multiple locations 102. The method 300 may include a control device 119 entering 302 a location 102. Entering 302 a location 102 may include a change in physical location. In other embodiments, entering 302 a location 102 may include gaining access, whether physical, electronic, virtual, or otherwise, to the location 102. For example, the location 102 may include a control network. Entering 302 a location 102 may include becoming capable of communicating with a node 105 and/or other device in a control network.

In the present embodiment, the control device 119 may identify 304 the location 102. For example, the control device 119 may identify 304 the location 102 by attempting to connect to a control network at the location 102. If the control device 119 is capable of connecting to the control network, the control device 119 may determine that the control device 119 is in a location 102 that includes the control network to which the control device 119 is connected and thereby identify 304 the location 102.

In some embodiments, the control device 119 may identify 304 the location 102 by attempting to communicate with a node 105 and/or other device at the location 102. For example, the control device 119 may send an infrared signal to a node 105 at the location 102. The location 102 may be an enclosed room. An infrared signal sent within a room typically would remain within that room. If the node 105 receives and/or processes the signal, the control device 119 may determine that it is at a particular physical location, i.e. in the room, and thereby identify 304 the location 102. In other embodiments, the control device 119 may identify 304 the location 102 using GPS and/or other location technology.

In a further embodiment, a control device 119 that sends an infrared signal may only operate in a certain location 102. For example, the control device 119 may have a button that may output different infrared codes depending on the room in which the controller is located.

The method 300 may include mapping 306 control functions 107 based on an identified location 102. For example, if the control device 119 were installed in a car, as the car approaches a garage, the location 102 may be identified 304 as "home" and the control functions 107, i.e. the garage door opening functions, may be mapped 306 to facilitate communication with the "home" garage door opener. In another example, as the car approaches another garage, the location 102 may be identified 304 as "office" and the control functions 107 may be mapped 306 to facilitate communication with the "office" garage door opener. In embodiments where identifying 304 the location 102 is based on attempting to communicate with a node 105 and/or other device at the location 102, mapping 306 control functions 107 may be accomplished based on the ability of the control device 119 to communicate with the node 105 and/or other device.

The control device 119 may control 308 a node 105 at the location 102. Controlling 308 the node 105 may include sending a request for the node 105 to perform an action. For example, a control device 119 in a car may control 308 a "home" garage door by sending a signal to the garage door opener.

Figure 4:
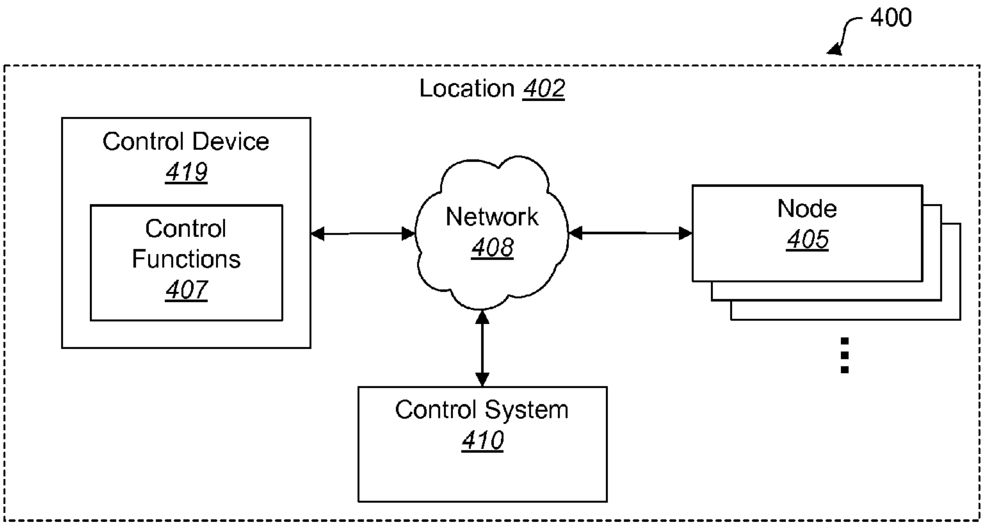
FIG. 4 is a block diagram illustrating an embodiment of a system for providing roaming control of devices at multiple locations.

FIG. 4 is a block diagram illustrating an embodiment of a system 400 for providing roaming control of nodes 405 at multiple locations 402. The system 400 may include a location 402. The location 402 may include a control device 419, a network 408, a control system 410, and/or various nodes 405. In other embodiments, the system 400 may include multiple locations 402, control devices 419, networks 408, control systems 410, and/or nodes 405.

The control device 419 may communicate 206 with the nodes 405 at the location 402. In the present embodiment, the control device 419 may control 308 the nodes 405 at the location 402. The control device 419 may identify 304 the various locations 402.

The control device 419 may include control functions 407. The control functions 407 may be mapped 204, 306 based on the location 402 in which the control device 419 is located. In the present embodiment, the control device 419 may communicate 206 with and/or control 308 the nodes 405 using the control functions 407.

The control device 419 may be in electronic communication with the network 408. The network 408 may be a wired, wireless, and/or other network. For example, the control device 419 may communicate with the network 408 via an infrared (IR) connection, an Ethernet connection, a wireless connection using the 802.11g (WiFi) standard, a wireless connection using the 802.15.4 (ZigBee) standard, and/or other wired, wireless, and/or other connections.

The control system 410 may be in electronic communication with the control device 419 and/or the nodes 405 through the network 408. The control device 419 may communicate 206 with and/or control 308 the control system 410. The control system 410 may be used to control 308 the nodes 405 at the location 402. The control system 410 may identify 304 the location 402 in which the control device 419 is located. In the present embodiment, the control device 419 may communicate 206 with and/or control 308 the nodes 405 using the control functions 407.

The nodes 405 may be used to provide services at the location 402. The nodes 405 may include devices that may be controlled 308 by a control device 419. For example, the nodes 405 may include a garage door opener, audio/visual devices, automatic door locks, light switches, vents, fans, furnaces, and so forth. The services that the nodes 405 may provide might include opening and/or closing a garage door, locking and/or unlocking door locks, presenting audio/visual material, turning light switches on and/or off, opening and/or closing vents, turning fans on and/or off, etc.

In some embodiments, the control device 419 may be capable of both direct and indirect communication with the nodes 405. Indirect communication with the nodes 405 may include communication through the control system 410. In other embodiments, the control devices 419 may only be capable of direct communication with the nodes 405 or indirect communication through the control system 410.

Figure 5:
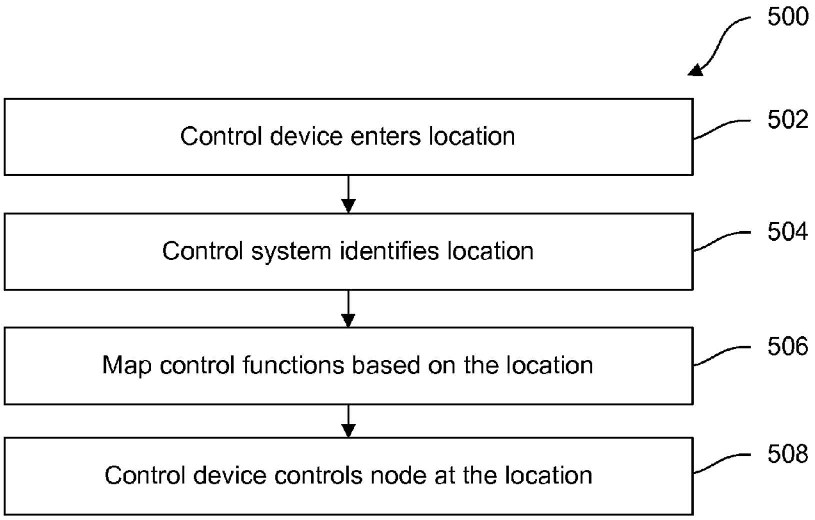
FIG. 5 is a flow diagram of an embodiment of a method for providing roaming control of devices at multiple locations.

FIG. 5 is a flow diagram of an embodiment of a method 500 for providing roaming control of nodes 105 at multiple locations 102. The method 500 may include a control device 119 entering 502 a location 102.

In the present embodiment, the control system 410 may identify 504 the location 102. For example, the control system 410 may broadcast a signal at the location 102. If the control device 119 acknowledges the signal, the control system 410 may determine that the control device 119 is at the location 102 that includes the control system 410 and thereby identify 504 the location 102. In another example, the control system 410 may identify 504 the location 102 by authenticating and/or registering the control device 119.

The method 500 may include mapping 506 control functions 107 based on the location 102. Mapping 506 control functions 107 may include mapping an I/O interface.

The control device 119 may control 508 a node 105 at the location 102. Controlling 508 the node 105 may include sending a request for the node 105 to perform an action.

Figure 6:
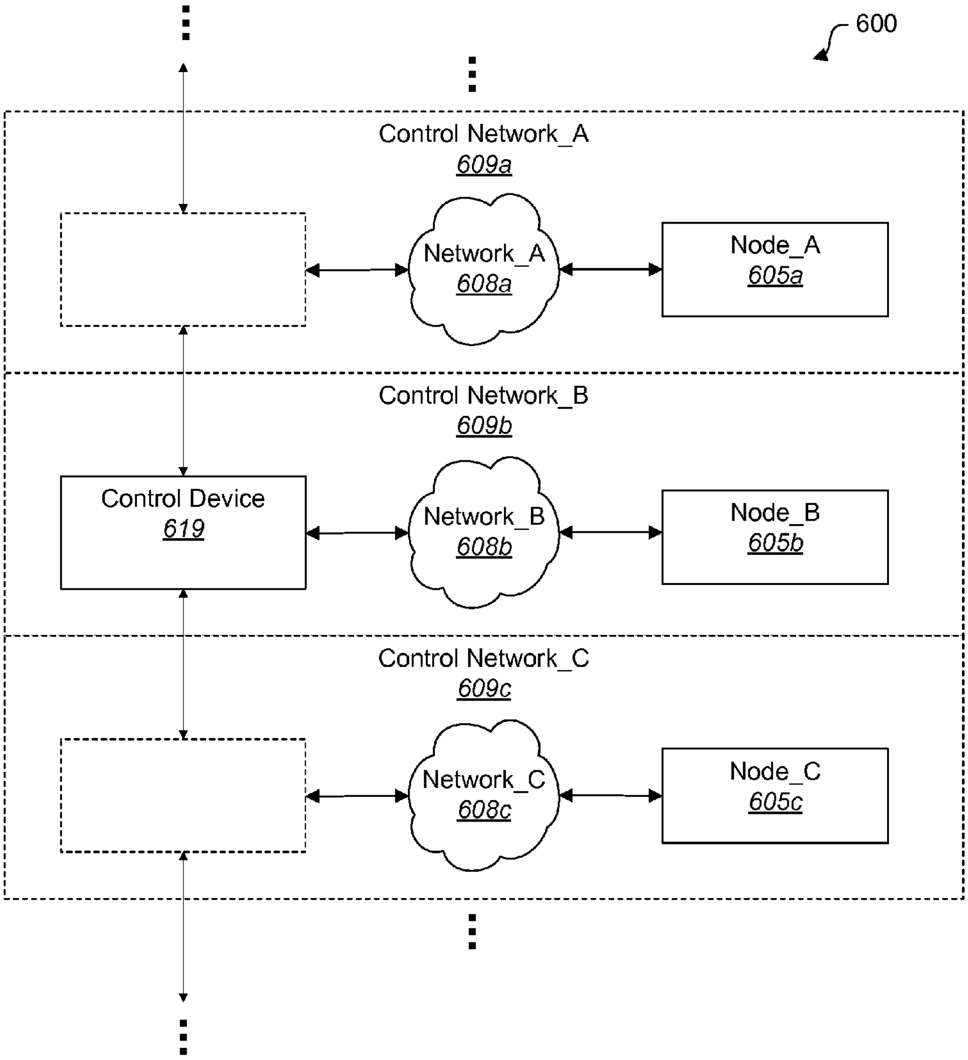
FIG. 6 is a block diagram illustrating an embodiment of a system for providing roaming control of devices at multiple locations.

FIG. 6 is a block diagram illustrating an embodiment of a system 600 for providing roaming control of nodes 605 at multiple locations 102. The system 600 may include a control device 619 and multiple control networks 609. The control networks 609 may include a network 608 and/or various nodes 605. In other embodiments, the control networks 609 may include a control system 410. In the present embodiment, three control networks 609 are included in the system 600. In other embodiments, more or fewer control networks 609 may be included in the system 600.

The control device 619, in the present embodiment, is located in control network_B 609*b*. As shown in FIG. 6, the control device 619 may change location 102. For example, the control device 619 may move from control network_B 609*b* to control network_A 609*a*, control network_C 609*c*, and/or any other control network 609.

The control device 619 may communicate 206 with the nodes 605 in the various control networks 609, which may facilitate providing roaming control of one or more nodes 605. In the present embodiment, the control device 619 may control 308 the nodes 605 at the various control networks 609.

In another embodiment, more than one control device 619 may be located in a control network 609 at one time. In embodiments with multiple control devices 619 located in one location 102, such as a control network 609, each control device 619 may be capable of controlling 308 the same node 605 at the location 102. For instance, each control device 619 may be capable of controlling 308 a television in a room. Conflicting control requests and/or commands may be resolved based on privilege levels, a voting algorithm, and/or any other conflict resolution process.

In the television example, one control device 619 may have a privilege setting that is recognized at the location 102 and may prevent the other control device (not shown) from controlling 308 the television. In another example, the control devices 619 may vote to determine which command should prevail. If there were three control devices 619, for example, the control devices 619 may vote to change the channel. If there is a majority of votes to change the television to a channel, the channel may be changed to that channel. If there is no majority, the determination may be made by weighing each vote based on an according privilege level. To illustrate, if all three control devices 619 voted for separate channels, the control device 619 with the highest privilege level might prevail. In some embodiments, control networks 608 may be separate both physically and/or logically. In other embodiments, a plurality of control networks 608 may overlap a particular physical location.

Figure 7:
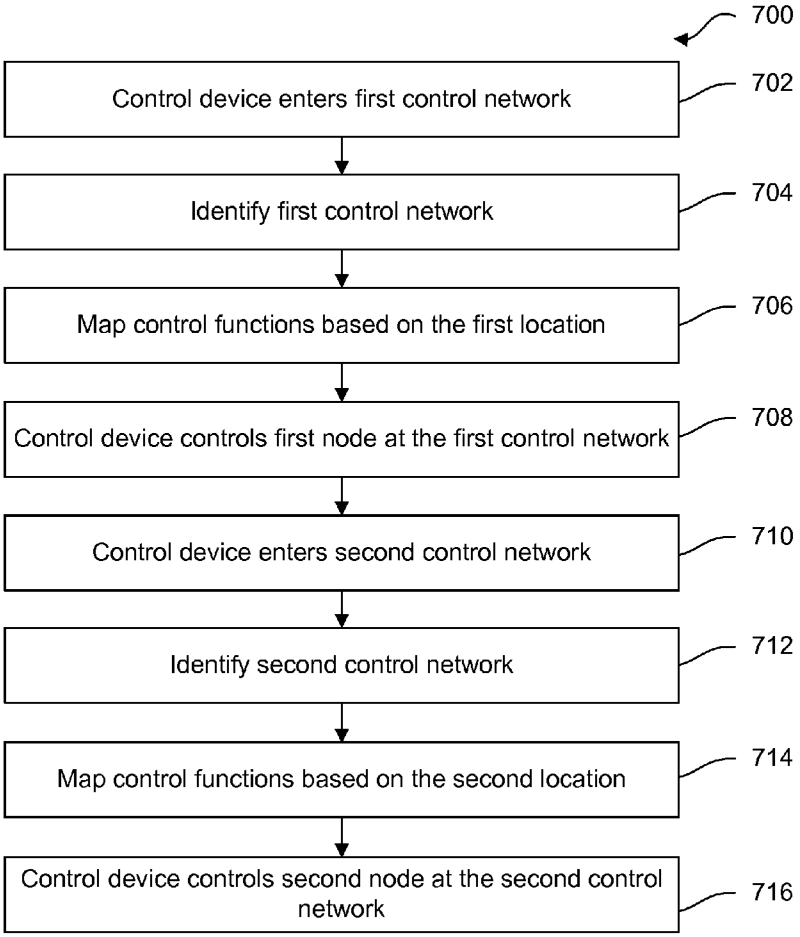
FIG. 7 is a flow diagram of an embodiment of a method for providing roaming control of devices at multiple locations.

FIG. 7 is a flow diagram of an embodiment of a method 700 for providing roaming control of nodes 105 at multiple locations 102. The method 700 may include a control device 119 entering 702 a first control network 609*a*. Entering 702 a control network 609 may include a change in physical location. Entering 702 a control network 609 may include becoming capable of communicating 206 with and/or controlling 308 a node 105 and/or other device in the control network 609.

In the present embodiment, the control device 119 may identify 704 the first control network 609*a*. The control network 609 may be identified 704 using similar techniques for identifying 202, 304, 504 a location 102.

The method 700 may include mapping 706 control functions 107 based on the identified first control network 609*a*. For example, if the control device 119 were a key-fob (i.e., a type of security token, e.g., a device with built-in authentication), as the user approaches a building, the first control network 609*a* may be identified 704 as "home" and the control functions 107, such as unlocking a door, turning on lights, and/or other control functions 107, may be mapped 706 to facilitate communication with the "home" control network 609*a*. The control device 119 may control 708 a first node 605*a* at the first control network 609*a*. For example, the key-fob may control 708 the "home" front door locks.

The control device 119 may enter 710 a second control network 609*b*. The method 700 may include identifying 712 the second control network 609*b*. The method 700 may include mapping 714 control functions 107 based on the identified second control network 609*b*. Using the example of a key-fob, the user may leave "home", i.e. the first control network 609*a*, and as the user approaches another building (with a second control network 609*b*), the second control network 609*b* may be identified 712 as "office" and the control functions 107 may be mapped 714 to facilitate communication with the "office" control network 609*b*.

The control device 119 may control 716 a second node 605*b* at the second control network 609*b*. Controlling 708, 716 nodes 105 at a control network 609 may include sending a request for the node 105 to perform an action. For example, a control device 119, i.e. a key-fob, may control 708, 716 the "home" front door locks at a first control network 609*a* and the "office" front door locks at a second control network 609*b*.

Figure 8:
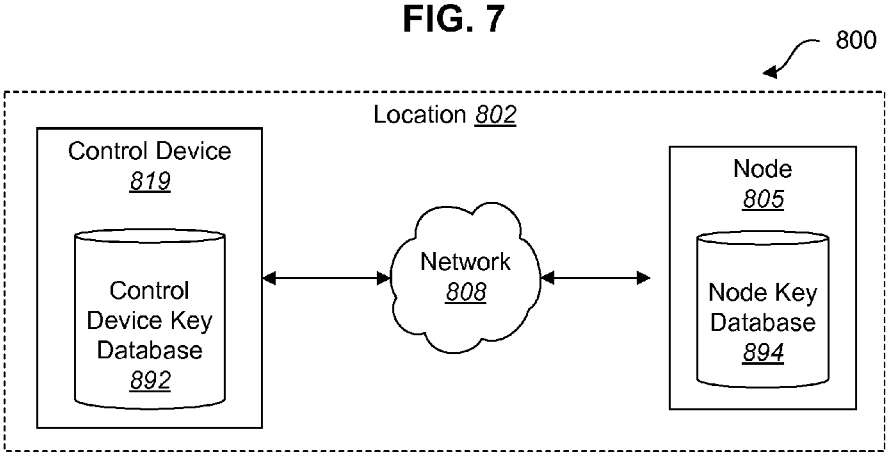
FIG. 8 is a block diagram illustrating an embodiment of a system for providing roaming control of devices at multiple locations.

FIG. 8 is a block diagram illustrating an embodiment of a system 800 for providing roaming control of nodes 805 at multiple locations 802. The system 800 may include a location 802. The location 802 may include a control device 819, a network 808, and/or various nodes 805. In other embodiments, the system 800 may include multiple locations 802, control devices 819, networks 808, and/or nodes 805. Other embodiments may include a control system 410.

The control device 819 may include a control device key database 892. The control device key database 892 may include an encryption key for communicating 206 at the location 802. For instance, the network 808 may be an encrypted network. The control device 819 may use an encryption key from the control device key database 892 to enable communication 206 with devices at the location 802, i.e. nodes 805, a control system 410, and/or other devices.

The nodes 805 may include a node key database 894. The node key database 894 may include a list of approved keys for communication 206 with the node 805. The node key database 894 may include keys for more than one control device 819 and/or other devices.

The control device 819 may communicate 206 with the nodes 805 at the location 802. Communicating 206 with the nodes 805 may include sending a key from the control device key database 892 to authenticate and/or register the control device 819 with the location 802. The control device 819 may be used to provide roaming control of a node 805 at the location 802. In some embodiments, the control device 819 may control 308 the nodes 805 at the location 802.

The control device 819 may be in electronic communication with the network 808. The network 808 may be a wired, wireless, and/or other network. For example, the control device 819 may communicate with the network 808 via an infrared (IR) connection, an Ethernet connection, a wireless connection using the 802.11g (WiFi) standard, a wireless connection using the 802.15.4 (ZigBee) standard, and/or other wired, wireless, and/or other connections.

The nodes 805 may be used to provide services at the various locations 802. The nodes 805 may include devices that may be controlled by a control device 819.

Figure 9:
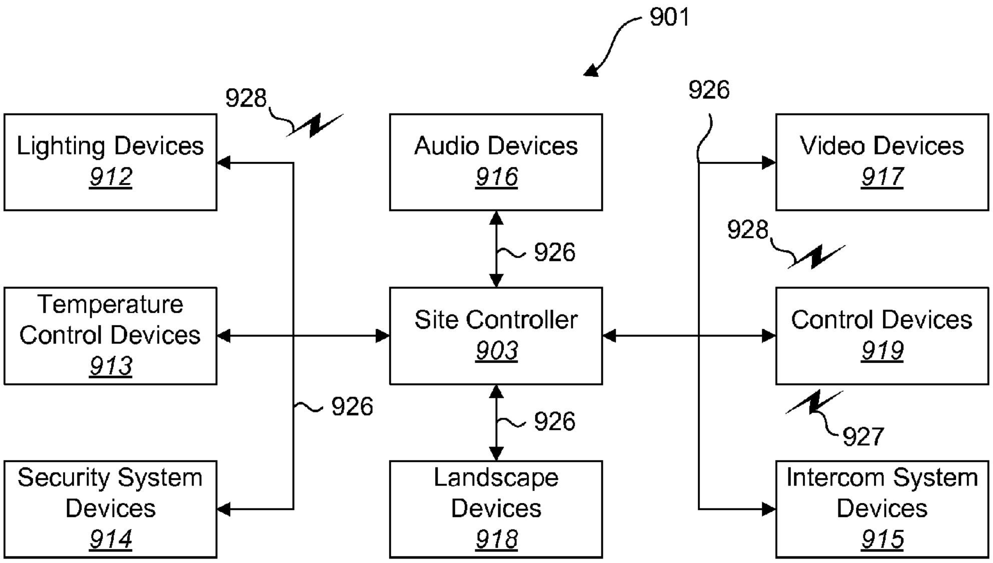
FIG. 9 is a block diagram illustrating an embodiment of a site in which the present systems and methods may be implemented.

FIG. 9 is a block diagram illustrating an embodiment of a site 901 in which the present systems and methods may be implemented. The site 901, in the present embodiment, includes a site controller 903 and other site devices. The site controller 903 may be in electronic communication with the site devices. A site 901 may include multiple site controllers 903, but typically requires that one of the site controllers 903 is designated as the primary site controller 903.

The site controller 903 may be connected to the site devices via wireless or wired connections. In the present embodiment, the site controller 903 may be connected to the site devices via an Ethernet connection 926, a WiFi connection 927, a ZigBee connection 928, or a combination of the three. The site controller 903 may be capable of communicating via these network connections, i.e. Ethernet, WiFi, or ZigBee connections 926, 927, 928 or other connections.

The site devices, in the present embodiment, may include lighting devices 912, temperature control devices 913, security system devices 914, intercom system devices 915, audio devices 916, video devices 917, landscape devices 918, and control devices 919. Lighting devices 912 may include light switches, dimmers, window blinds, etc. Temperature control devices 913 may include thermostats, fans, fireplaces, and the like. Security system devices 914 may include security cameras, motion detectors, door sensors, window sensors, gates, or other security devices. Intercom system devices 915 may include intercom microphones, intercom related video devices, and other devices typically associated with an intercom system. Audio devices 916 may include AM/FM radio receivers, XM radio receivers, CD players, MP3 players, cassette tape players, and other site devices capable of producing an audio signal. Video devices 917 may include televisions, monitors, projectors, and other site devices capable of producing a video signal. Landscape devices 918 may include sprinkler system devices, drip system devices, and other landscape related devices. The control devices 919 may include touch screens, keypads, remote controls, and/or other control devices 919 capable of communicating 206 with and/or controlling 308 a node 105, control system 410, and/or other device.

The site 901 may be similar to the locations 102 and control networks 609 described in the embodiments above. The control devices 919 of the present embodiment may be the same as the control devices 119 of the previous embodiments. The site controller 903 may be one possible implementation of a control system 410. The site devices may include nodes 105 and/or other devices. For example, nodes 105 and/or other devices may be lighting devices 912, audio devices 916, video devices 917, temperature control devices 913, security system devices 914, landscape devices 918, intercom system devices 915, and/or other devices.

Figure 10:
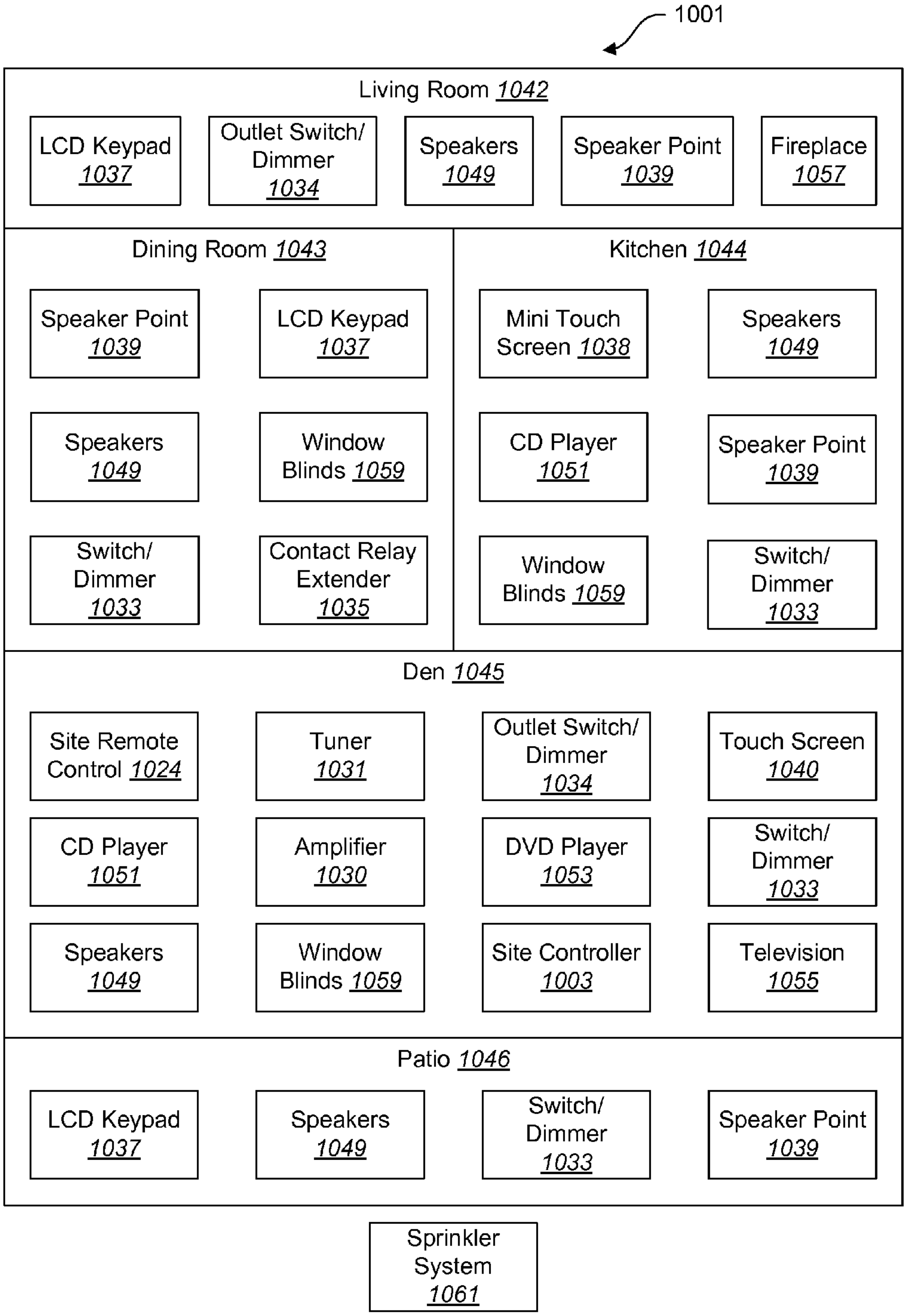
FIG. 10 is a block diagram illustrating an exemplary home site in which the present systems and methods may be implemented.

FIG. 10 is a block diagram illustrating an exemplary audio/visual home automation site 1001 in which the present systems and methods may be implemented. The audio/visual home automation site 1001 may include various areas, such as a living room 1042, dining room 1043, kitchen 1044, den 1045, and a patio 1046. Though the present embodiment illustrates a home automation site 1001, other sites 1001 may also implement the present systems and methods. For instance, the present systems and methods may be implemented in an office building, warehouse, or other site 1001. A site 1001 may not be limited to a particular building or space. Rather, a site 1001 may include a site controller 1003 and various site devices in electronic communication with the site controller 1003. A home, for example, may include more than one site 1001. In some embodiments, multiple site controllers 1003 may be used within the same site, though one site controller 1003 is typically designated as the primary site controller 1003.

Additional site devices, other than the site devices shown in FIG. 10, such as security system devices 914, intercom system devices 915, temperature control devices 913, etc., may also be used in the present embodiment of a site 1001. However, for ease of presentation, only lighting devices 912, audio devices 916, video devices 917, landscape devices 918, and control devices 919 are shown in FIG. 10. In the present embodiment, the audio devices 916 include amplifiers 1030, tuners 1031, speakers 1049, speaker points 1039, and CD players 1051. The video devices 917, in the present embodiment, may include DVD players 1053 and televisions 1055. In the present embodiment, control devices 919 may include site remote controls 1024, LCD keypads 1037, mini touch screens 1038, or other control devices 919. In the present embodiment, the lighting devices 912 may include switch/dimmers 1033, outlet switch/dimmers 1034, fireplaces 1057, and window blinds 1059. The landscape devices 918, in the present embodiment, may include a sprinkler system 1061. Other audio devices 916 and video devices 917 may be used in the present systems and methods, such as MP3 players, digital video recorders, satellite boxes, cable boxes, video game systems, and the like. Other lighting devices 912 and landscape devices 918 may also be used with the present systems and methods.

The site controller 1003, in the present embodiment of a site 1001, may be located in the den 1045. The site controller 1003 may be in electronic communication with various site devices over the network 408. In the present embodiment, some site devices, such as audio switches, amplifiers, and tuners may be connected to the site controller 1003 via Ethernet connections 926. Site remote controls 1024 may be connected to the site controller 1003 via ZigBee connections 928. Switch/dimmers 1033, outlet switch/dimmers 1034, multiple button keypads (not shown), and LCD keypads 1037 may be connected to the site controller 1003 via Ethernet connections 926 and ZigBee connections 928. Mini touch screens 1038 and contact relay extenders 1035 may be connected to the site controller 1003 via an Ethernet connection 926, a ZigBee connection 928, and a WiFi connection 927. Speaker points 1039 may be connected to the site controller 1003 via an Ethernet connection 926 and a WiFi connection 927. Touch screens 1040 may be connected to the site controller 1003 via a ZigBee connection 928 and a WiFi connection 927.

In the present embodiment, the den 1045 may include the site controller 1003, a switch/dimmer 1033, an outlet switch/dimmer 1034, a CD player 1051, a DVD player 1053, an amplifier 1030, a tuner 1031, a television 1055, speakers 1049, and window blinds 1059. The speakers 1049 in the den 1045 may be connected directly to the site controller 1003. A site remote control 1024 and a touch screen 1040 may also be located in the den 1045.

In the present embodiment, speakers 1049 that are not directly connected to the site controller 1003, such as the speakers 1049 in the living room 1042, dining room 1043, and kitchen 1044 and the speakers 1049 on the patio 1046, may be connected to one of the speaker points 1039. The speaker points 1039 may allow the speakers 1049 not directly connected to the site controller 1003 to be controlled by the site controller 1003. For example, the site controller 1003 may transmit audio signals to the speakers 1049 via the speaker points 1039. The audio signals, in the present embodiment, may be transmitted to the speaker points 1039 over an Ethernet connection 926 or a WiFi connection 927. However, any connection capable of the bandwidth necessary to transmit audio signals may be used. Similar connections may be used for transmitting video signals over a site 1001.

The site remote control 1024 and touch screen 1040 in the den 1045, the LCD keypads 1037 located in the living room 1042, dining room 1043, and on the patio 1046, and the mini touch screen 1038 located in the kitchen 1044 may be used to control all of the site devices in the site 1001 that are connected to the site controller 1003. For example, the LCD keypad 1037 in the living room 1042 may control the CD player 1051 in the den 1045 to play music over the speakers 1049 in the living room 1042 via the speaker point 1039 in the living room 1042. The LCD keypad 1037 in the living room 1042 may also, for example, control the CD player 1051 in the den 1045 to play music over all speakers 1049 in the site 1001 via their respective speaker points 1039 or a direct connection to the site controller 1003.

Typically devices like the window blinds 1059, the fireplace 1057, or the sprinkler system 1061 may not be capable of communication using an Ethernet, WiFi, or ZigBee connection 926, 927, 928. In order to control such devices, the contacts, relays, or other connections that control their function may be connected to a site device that is capable of communication with a site controller 1003.

To illustrate, the window blinds 1059 in the dining room 1043 may be connected to a contact relay extender 1035. The contact relay extender 1035 may then communicate with the site controller 1003 using an Ethernet connection 926, a WiFi connection 927, or a ZigBee connection 928. The site controller 1003 may then be programmed to raise, lower, or adjust the blinds 1059. If a user wanted to lower the blinds 1059 in the dining room 1043, the user may use the LCD keypad 1037 to send a signal to the site controller 1003, which would send a signal to the contact relay extender 1035, which would then send a signal to the servo of the window blinds 1059 to lower the blinds. The sprinkler system 1061 may be connected to the site controller 1003 in a similar fashion.

The site controller 1003 may be a control system 410. Nodes 105 and/or other devices may be lighting devices 912, audio devices 916, video devices 917, temperature control devices 913, security system devices 914, landscape devices 918, and/or intercom system devices 915. The control devices 119 in the embodiments described above may be the same control devices 919 described in the present embodiment. For example, a site remote control 1024, a touch screen 1040, and/or an LCD keypad 1037 may be a control device 119. The control devices 119 may include other devices, such as a garage door opener, a key-fob, a cellular phone, a portable music player, a PDA, and/or any other device capable of performing control functions 107.

The site 1001 may be similar to the locations 102 and/or control networks 609 in the embodiments described above. In some embodiments, the rooms 1042, 1043, 1044, 1045, 1046 may be locations 102 and/or control networks 609.

For example, the site remote control 1024 may be a control device 119. As the site remote control 1024 moves from the living room 1042 to the dining room 1043, i.e. enters 302 the second location 102 (or second control network 609*b*), the site remote control 1024 may identify 202 that it is in the dining room 1043. The site remote control 1024 may map 204 the control functions 107 to control the site devices in the dining room 1043. For example, the control functions 107 on the site remote control 1024 may have previously been mapped 204 to control the speakers 1049 in the living room 1042. By entering 302 the dining room 1043, the control functions 107 may be mapped 204 to communicate 206 with (and/or control 308) the speakers in the dining room 1043, but not the living room 1042.

Figure 11:
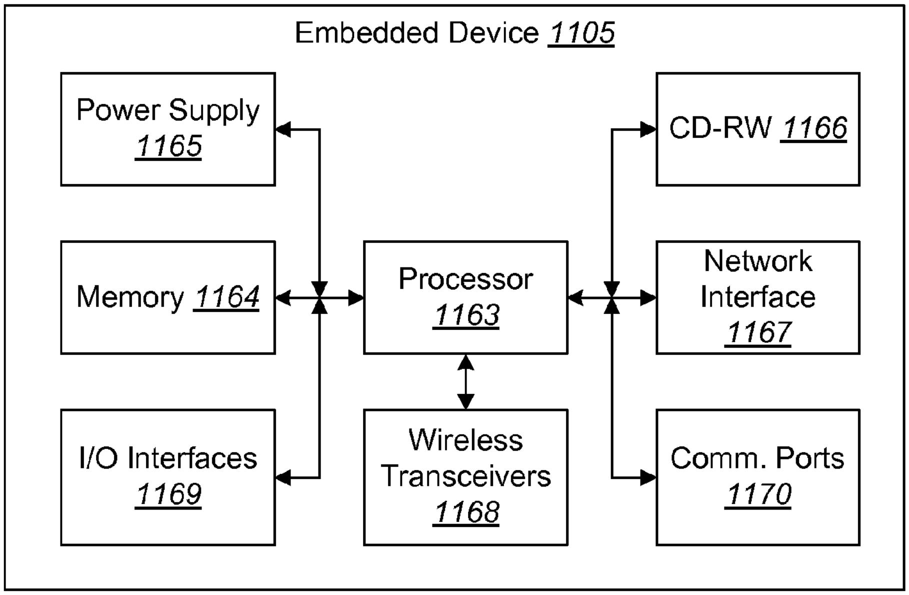
FIG. 11 is a block diagram illustrating various hardware components that may be used in an embodiment of an embedded device that may be found in the site.

FIG. 11 is a block diagram illustrating various hardware components that may be used in an embodiment of an embedded device 1105 that may be found in the site 901. The control devices 119, nodes 105, control systems 410, site controllers 903, site devices, and/or other devices may be embedded devices 1105.

The embedded device 1105 may include a processor 1163 that is in electronic communication with memory 1164. The memory 1164 may include volatile and/or non-volatile memory. The embedded device 1105 may include a power supply 1165. The embedded device 1105 may include a CD-RW drive 1166. In other embodiments, the CD-RW drive 1166 may not be a writeable drive, but may only be a CD-ROM drive. In still other embodiments, the CD-RW drive 1166 may be a DVD-RW or a DVD-ROM drive. The CD-RW drive 1166 may also be a Blu-ray disk and/or a HD DVD drive. The embedded device 1105 may be capable of using the CD-RW drive 1166 to rip audio or video data from CDs and DVDs.

The embedded device 1105 may include a network interface 1167 that allows the embedded device 1105 to connect using wired connections, such as Ethernet connections 926. The network interface 1167 may use various protocols to enable the embedded device 1105 to interface with any wired network. The embedded device 1105 may include wireless transceivers 1168. In the present embodiment, the embedded device 1105 may include a WiFi transceiver and a ZigBee transceiver. The embedded device 1105 may include any type of wireless transceiver 1168. For instance, the wireless transceiver 1168 may allow the embedded device 1105 to transmit and receive data using any wireless protocol, such as WiFi, ZigBee, Bluetooth, Ultra Wideband, Wimax, WirelessHD, and/or cellular protocols, such as GSM or EVDO.

The embedded device 1105 may include I/O interfaces 1169. For example, the I/O interfaces 1169 may include inputs and/or outputs such as buttons, selection dials, serial ports, contact ports, relay ports, IR windows, IR ports, video sense loop ports, audio ports, and video ports. The embedded device 1105 may include communication ports 1170. The communication ports 1170 may include USB ports, firewire ports, or other ports for communicating with other devices.

Some site controllers 903 and site devices may not include all of the illustrated components. Other site controllers 903 and site devices may include additional components. For example, many site devices may not include a CD-RW drive 1166.

Figure 12:
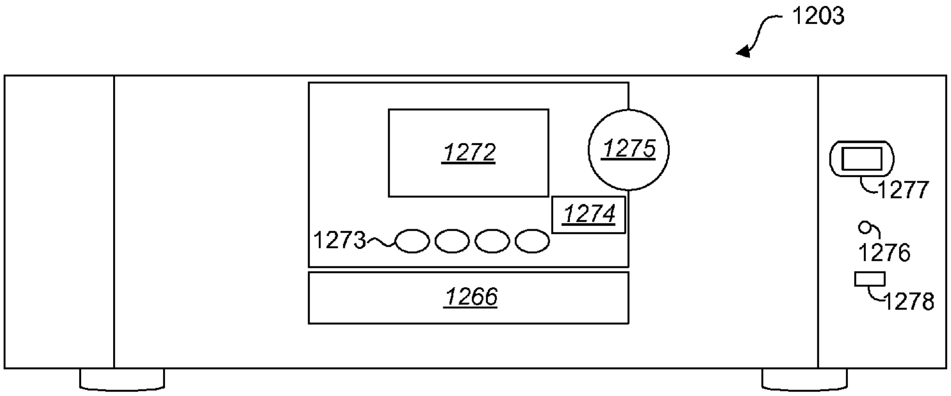
FIG. 12 is a front view of a block diagram illustrating the various features available in one possible embodiment of a site controller.

FIG. 12 is a front view of a block diagram illustrating the various features available in one possible embodiment of a site controller 1203. Specifically, FIG. 12 shows the front of an exemplary site controller 1203.

The site controller 1203 may include a display area 1272. The display area 1272 in the present embodiment may be used to display settings, playlist sections, title sections, media information, receiver status, and system menus. The site controller 1203 may also include various buttons 1273 for selecting options displayed in the display area 1272.

The site controller 1203 may also include an IR in window 1274. The IR in window 1274 may be used to receive IR codes from the site remote control 1024 or from any other device capable of sending IR signals, including other remote controls (not shown) used to control devices that are not capable of communication with the site controller 1203. The site controller 1203 may include a selection dial 1275. The selection dial 1275 may be used to scroll through menus and media lists displayed in the display area 1272.

In the present embodiment, the site controller 1203 may include a reset button 1276. The reset button 1276 may be used to refresh the node software. The site controller 1203 may also include a WiFi antenna 1277. The WiFi antenna 1277 may be used with an extender (not shown) to improve reception of wireless signals. A ZigBee antenna (not shown) may also be used to extend the range of a wireless transceiver 1168 using a ZigBee connection 928.

The site controller 1203 may also include a CD-RW drive 1266. As discussed above, the CD-RW drive 1266 may be replaced with any drive that is capable of playing CD or DVD related media. The CD-RW drive 1266 may be used to import CD or DVD data into the memory 1164 of the site controller 1203. The site controller 1203 may also include a USB port 1278. The USB port 1278 may be used to import data from USB enabled devices.

Figure 13:
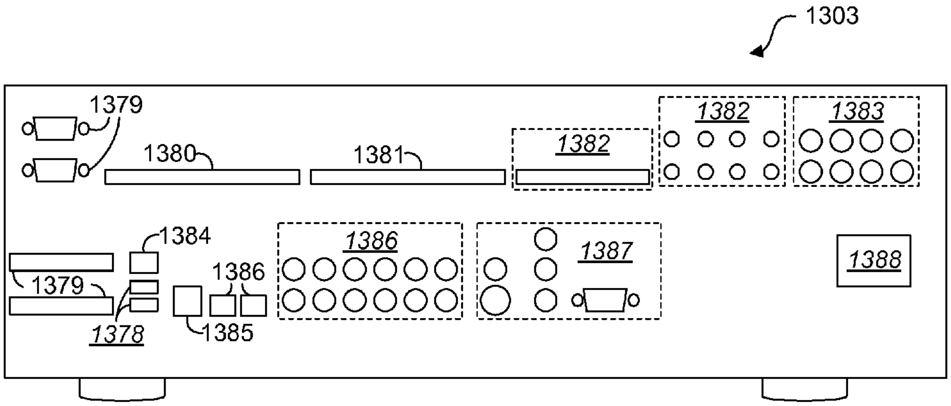
FIG. 13 is a rear view of a block diagram illustrating the various features available in one possible embodiment of a site controller.

FIG. 13 is a rear view of a block diagram illustrating the various features available in one possible embodiment of a site controller 1303. Specifically, FIG. 13 shows the back of an exemplary site controller 1303. Most connectors and ports are typically found on the back of the site controller 1303 leaving the front more aesthetically pleasing. However, the location of the various connectors and ports is typically not functionally important.

The site controller 1303 may include serial ports 1379. The serial ports 1379 may include standard serial ports and configurable serial ports. The standard serial ports may be used for RS-232 or other I/O devices, which include hardware flow control. In the present embodiment, the site controller 1303 may include two standard serial ports. The configurable serial ports may be used for RS-232, RS-422, or RS-485 devices or for other serial I/O devices. In the present embodiment, the site controller 1303 may include two configurable serial ports.

The site controller 1303 may include contact ports 1380. The contact ports 1380 may include a pluggable terminal block connector that may be used for dry contact closure, or logic input connections, such as door switches or motion sensors. In the present embodiment, the site controller 1303 may include six contact ports 1380. The site controller 1303 may include relay ports 1381. The relay ports 1381 may include a pluggable terminal block connector that may be used for normally closed or normally opened switchable connections, such as blinds, fireplace, or projector screens. In the present embodiment, the site controller 1303 may include six relay ports 1381.

The site controller 1303 may include IR ports 1382. The IR ports 1382 may include IR in ports and IR out ports. The IR in ports may include a pluggable terminal block connector that may be used for handheld IR devices, such as device specific remote controls (not shown). In the present embodiment, the site controller 1303 may include four IR in ports. The IR out ports may include 3.5 mm earphone jacks. The IR out ports may be used for IR sticky emitters that can be placed over IR readers on media players, TVs, or other targets to transmit an IR signal from site controller 1303 to the target. In the present embodiment, the site controller 1303 may include eight IR out ports. The site controller 1303 may include video sense loop in/out ports 1383. The video sense loop in/out ports 1383 may be composite ports for video sources, such as DVD players or VCRs, which allow the site controller 1303 to detect the On/Off status of devices that use the same IR code for both on and off commands. The site controller 1303, in the present embodiment, may include four pairs of video sense loop in/out ports 1383 (four in and four out).

The site controller 1303 may include an Ethernet connector 1384 for establishing an Ethernet connection 926 with the site devices in a site 801. The Ethernet connector 1384 may be connected to the network interface 1167 on the site controller 1303. The Ethernet connector 1384 may be an RJ-45 for a 10/100 BaseT Ethernet connector. In the present embodiment, the site controller 1303 may include an additional USB port 1378 on the back of the site controller 1303. A modem port 1385 may be included with the site controller 1303. The modem port 1385 may be an RJ-11 port for a modem to support caller ID or a voice menu system.

The site controller 1303 may also include audio in/out ports 1386. The audio in ports may be RCA jacks for stereo channel input for stereo analog sources. In the present embodiment, the site controller may include three audio in ports. The audio out ports may be RCA jacks for stereo channel output. In the present embodiment, the site controller 1303 may include three audio out ports. The audio in/out ports 1386 may include digital audio in/out ports. The digital audio in/out ports may be designed for a Toslink™ optical cable for digital audio in/out, like MP3 players, CD players, DVD players, etc.

The site controller 1303 may include various video ports 1387. The video ports 1387 may be in/out ports and may include composite video ports, S-Video ports, component video ports, and/or VGA ports. The video ports 1387 may be used to display navigation menus on a monitor or TV. In the present embodiment, the video ports 1387 include a composite video out port, an S-Video out port, a component video out port, and a VGA out port. A power plug port 1388 may be included in the site controller 1303.

The site controller 1303 is different than a personal computer for a number of reasons. The site controller 1303 is an embedded system that is specialized for the functions and purposes set forth herein. The site controller 1303 generally does not include a keyboard or mouse for standard operation. Unlike a personal computer, the site controller 1303 may not contain an expandable motherboard. For example, the site controller 1303 may not include expandable memory slots or expandable ports, such as a PCI, AGP, or PCI Express card slot. Unlike a personal computer, the site controller 1303 may also not have an exclusive computer monitor. For example, typically a personal computer may include a relatively large monitor or display that is primarily for viewing an operating system user interface and executed programs. The site controller 1303 may merely use a television or monitor for brief periods of time, although the television or monitor may primarily be used for viewing television programming, DVDs, etc. In another example, the site controller 1303 may be used without a separate monitor; the site controller 1303 may use the display area 1372. Typically, a personal computer with such a small display area would be incapable of the multiple interfaces and ports that may be found on a site controller 1303. The site controller 1303 may also not have the capability to install and run third party software, such as word processing software. The site controller 1303 typically does not allow a user to install and run third party software on the controller 1303. Unlike a personal computer, a typical user generally could not install a different operating system on the site controller 1303.

Figure 14:
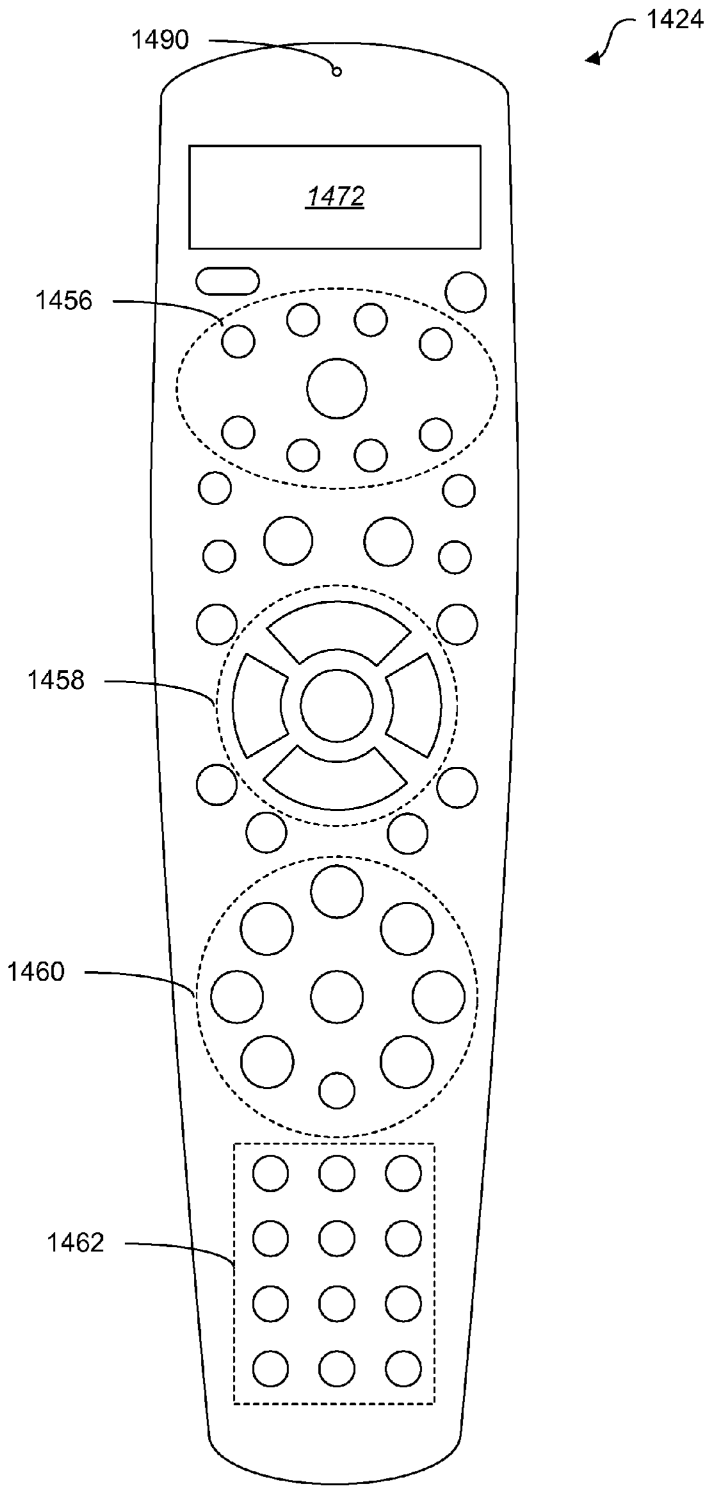
FIG. 14 is a block diagram illustrating the various features available in one possible embodiment of a site remote control.

FIG. 14 is a block diagram illustrating the various features available in one possible embodiment of a site remote control 1424. The site remote control 1424 may include a display area 1472. The display area 1472 may be a backlit LCD screen. In some embodiments, the display area 1472 may be a simple LCD screen such that the LCD screen has limited capacity to display information.

The site remote control 1424 may include a microphone 1490, an audio in port 1386, or the like. In the present embodiment, the site remote control 1424 may not include a speaker 1049. In other embodiments, the site remote control 1424 may include a speaker 1049, audio out port 1386, or the like.

The site remote control 1424 may include various I/O interfaces 1169. The I/O interfaces 1169 may include buttons or controls for user input. For example, the site remote control 1424 may include activity selection buttons 1456, navigation controls 1458, device control inputs 1460, input controls 1462, and/or other I/O interfaces 1169. The activity selection buttons 1456 may allow the user to select which devices to control. For example, the activity selection buttons 1456 may include buttons that allow the user to control televisions, video recording/playback devices, temperature control devices, lighting devices, security devices, audio recording/playback devices, and/or other devices.

The navigation controls 1458 may include navigation buttons that allow a user to navigate through user interfaces. For example, navigation buttons may allow the user to select various options presented in the display area 1472.

The device control inputs 1460 may include device control buttons. The device control inputs 1460 may allow a user to perform functions that were previously performed by the device specific remote control. For example, the device control inputs 1460 may include device control buttons such as play, stop, pause, fast-forward, rewind, record, etc. that would typically be found on a DVD or VCR device specific remote control.

The input controls 1462 may include numeric, alphanumeric, or other arrangements of input buttons. The input controls 1462 may allow a user to input alphanumeric characters. For example, in the present embodiment, the input controls 1462 may be numeric buttons such as the numbers 0-9 that may also be used to input text using various systems, such as Multi-Tap or T9, iTap, LetterWise, or other predictive text technology. The input controls 1462 may include a qwerty keyboard, thumbboard, or other layout.

The site remote control 1424 may include a wireless transceiver 1168. The wireless transceiver 1168 may be used to send wireless signals over the network 408. In the present embodiment, the wireless transceiver 1168 may be used to send data over a ZigBee connection 928.

The control functions may include I/O interfaces 1169. For example, mapping 204 a control function 107 may include mapping the I/O interfaces 1169 to communicate 206 with and/or control 308 site devices in a particular location 102.

Figure 15:
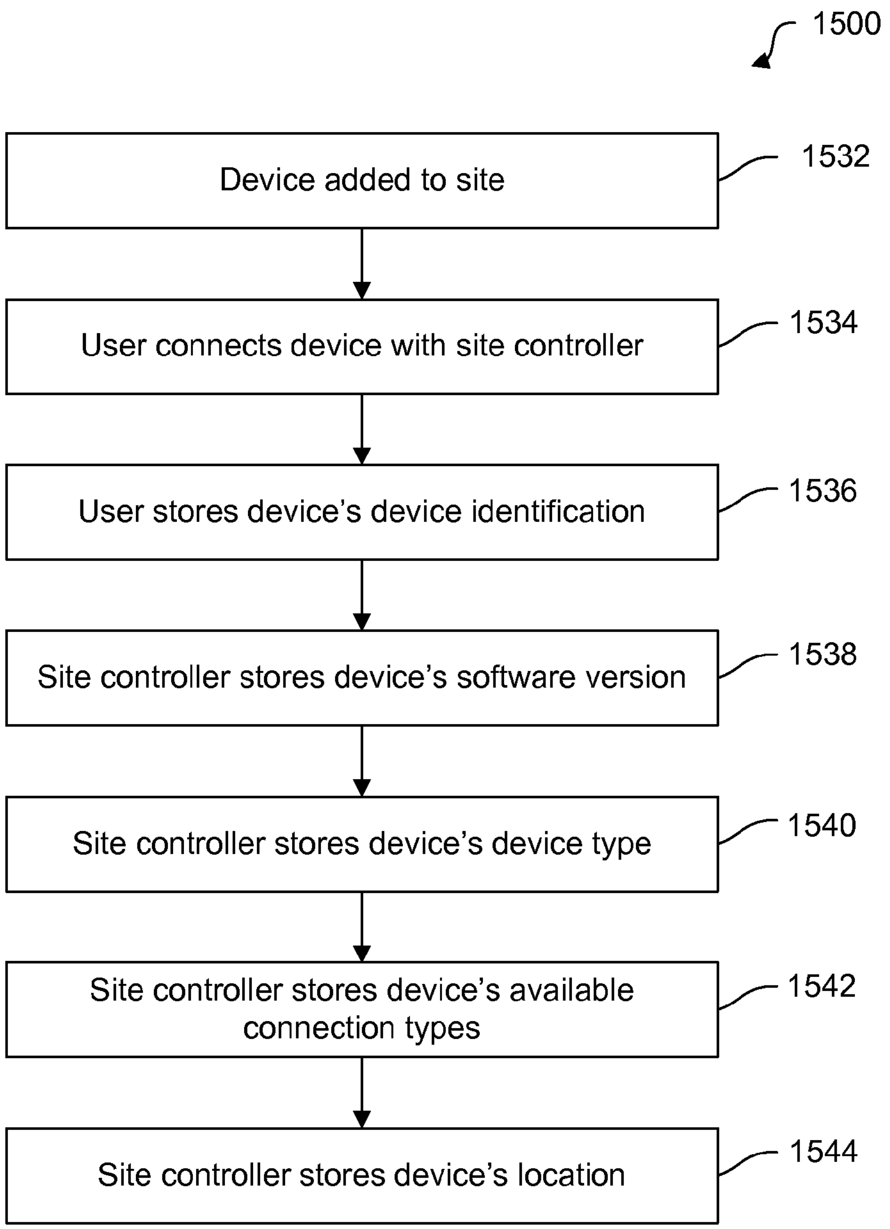
FIG. 15 is a flow diagram of an embodiment of a method for registering site devices at a site.

FIG. 15 is a flow diagram of an embodiment of a method 1500 for registering site devices at a site 901. As was mentioned earlier, the control system 410 may identify 504 the location 102 by authenticating and/or registering the control device 119. A site device may be added 1532 to the site 901. For example, a switch/dimmer 1033 may be installed in a home or a thermostat may be installed in an office building. In another example, a site remote control 1024 or LCD keypad 1037 may be installed in a home or office. For site devices that are capable of communication over an Ethernet connection 926, adding 1532 a device to a site 901 may include connecting the device over an Ethernet connection 926. The user may connect 1534 the device with the site controller 103. Connecting 1534 the device with the site controller 903 may include turning on the device to enable wired or wireless communication with the site controller 903.

The user may store 1536 a device identification for the site device on the site controller 903 by accessing the site controller 903. For example, the device identification may be stored in a site database on the site controller 903. The site controller 903 may store 1538 the device functionality of the site device. For example, the device functionality may be stored in the device database on the site controller 903. The site controller 903 may store 1540 a device type for the site device on the site controller 903 (e.g., in the device database on the site controller 903). The site controller 903 may store 1542 the connection types available for the site device on the site controller 903. For example, if the site device is capable only of an Ethernet connection 926 and a ZigBee connection 928, this may be stored 1542 on the site controller 903. The site controller 903 may store 1544 the location of the site device. For example, the device location may indicate if the site device is located in the living room 1042, dining room 1043, kitchen 1044, den 1045, or on the patio 1046, etc. The device identification, device type, available connection types (i.e., an Ethernet connection 926, a WiFi connection 927, a ZigBee connection 928, or other connection types), and device location may be stored 1536, 1538, 1540, 1542, 1544 in the device database on the site controller 903.

In another embodiment, the site controller 903 may determine and store the device identification, device type, device functionality, available connection types, or device location without user input. For example, the site controller 903 may attempt to determine the available connection types by pinging the site device, the device location by comparing the device's response time to requests, the device type or device functionality by attempting to perform functions typically performed by the various device types, etc.

In a further embodiment, the control device 119 may send a request to a node 105. The request may normally control any site device that receives the request. For example, the control device 119 may send a request to all speaker points 1039 to which all speaker points 1039 might normally respond.

The site controller 1003 may determine the location 102 of the control device 119. This determination may be made prior to and/or after the request is sent. The devices may receive the request from the control device 119. For example, the speaker points 1039 in the living room 1042, the dining room 1043, the kitchen 1044, and/or the patio 1046 may receive the request. The devices may determine whether they should perform the request. For example, the site controller 1003 may broadcast the determined location 102 of the control device 119. In another example, the device may request the location 102 of the control device 119 from the site controller 1003 and may receive the determined location 102 of the control device 119 from the site controller 1003. This may allow a node 105 that may receive and generally react to a sent request to determine that the request may not apply to that particular node 105 based on the location 102 of the control device 119.

If a device determines that it should perform the request, the device may perform the request. For example, if the control device 119 is in the living room 1042 and the request is for a speaker point 1039 to turn on the speakers, the speaker point 1039 in the living room 1042 may determine that, because it is in the same location 102 as the control device 119, it should turn on the speakers in the living room 1042. The location 102 may include the specific room 1042, 1043, 1044, 1045, 1046 at the site 1001 and/or a zone and/or area.

In a still further embodiment, the control device 119 may determine its location 102. The control device 119 may broadcast its location 102. The devices may receive the location 102 of the control device 119. The devices may store the location 102 of the control device 119.

The devices may receive a request from the control device 119. In the previous example, the speaker points 1039 in the living room 1042, the dining room 1043, the kitchen 1044, and/or the patio 1046 may receive the request. The devices may determine whether they should perform the request. For example, the devices may use the control device location 102 received from the control device 119 to determine whether they should perform the request.

If a device determines that it should perform the request, the device may perform the request. Using the previous example, if the control device 119 is in the living room 1042 and the request is for a speaker point 1039 to turn on the speakers, the speaker point 1039 in the living room 1042 may determine that, because it is in the same location 102 as the control device 119, it should turn on the speakers in the living room 1042.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for location based control of nodes at multiple locations, the method being performed by a control device, the method comprising:

identifying a first location by the control device, wherein the control device includes a control device key database having a first encryption key for communicating at the first location;

mapping by the control device a control function that is stored on the control device, wherein the mapping occurs based on the first location such that the control function, while the control device is in the first location, results in a first action being performed in relation to a first node, wherein the first node includes a node key database having a list of approved keys for communication with the first node, and wherein the node key database includes keys for more than one control device;

communicating with the first node at the first location, wherein communicating with the first node comprises sending the first encryption key from the control device key database to the first node to authenticate the control device with the location;

identifying a second location by the control device;

mapping by the control device a control function based on the second location such that the control function, while the control device is in the second location, results in a second action being performed in relation to a second node, wherein the same control function performs a different action in the first location and the second location such that the first action is different from the second action; and communicating with the second node at the second location, wherein communicating with the second node comprises using a second encryption key to communicate with the second node at the second location.

2. The method of claim 1, wherein identifying the first location comprises attempting to connect to a control network.

3. The method of claim 1, wherein identifying the first location comprises attempting to communicate with the first node at the first location.

4. The method of claim 1, wherein identifying the first location comprises determining the ability of the control device to control the first node at the first location.

5. The method of claim 1, wherein communicating with the first node at the first location comprises controlling the first node at the first location using the mapped control function.

6. The method of claim 5, wherein controlling the first node at the first location comprises controlling the first node over a wireless network.

7. The method of claim 6, wherein the wireless network is selected from the group consisting of: an infrared network, a ZigBee network, or a WiFi network.

8. The method of claim 1, wherein the control device is installed in a car, and wherein the control function comprises communicating with a garage door opener.

9. The method of claim 1, wherein identifying the first location comprises using GPS.

10. The method of claim 9, wherein the control device comprises a key-fob, and wherein the control function comprises locking and/or unlocking doors.

11. The method of claim 10, wherein identifying the first location by the control device comprises identifying a first control network, and wherein identifying the second location by the control device comprises identifying a second control network, and wherein the first control network and the second control network both physically and logically separate networks.

12. The method of claim 11, further comprising using a voting algorithm and privilege levels to resolve conflicting control requests.

13. The method of claim 12, wherein the control device communicates through a control system with the first node.

14. The method of claim 13, wherein the control device comprises encryption keys for each of the nodes it communicates with.

15. A system configured for location based control of nodes at multiple locations, the system comprising:

a control device comprising:

a processor;

memory in electronic communication with the processor; and instructions stored in the memory, the instructions upon being executed cause the processor to:

identify a first location by the control device, wherein the control device includes a control device key database having a first encryption key for communicating at the first location;

map by the control device a control function that is stored on the control device, wherein the mapping occurs based on the first location such that the control function, while the control device is in the first location, results in a first action being performed in relation to a first node, wherein the first node includes a node key database having a list of approved keys for communication with the first node, and wherein the node key database includes keys for more than one control device;

communicate with the first node at the first location, wherein communicating with the first node comprises sending the first encryption key from the control device key database to the first node to authenticate the control device with the location;

identify a second location by the control device;

map by the control device a control function based on the second location such that the control function, while the control device is in the second location, results in a second action being performed in relation to a second node, wherein the same control function performs a different action in the first location and the second location such that the first action is different from the second action; and communicate with the second node at the second location, wherein communicating with the second node comprises using a second encryption key to communicate with the second node at the second location.

16. The system of claim 15, wherein identifying the first location comprises attempting to connect to a control network.

17. The system of claim 15, wherein identifying the first location comprises attempting to communicate with the first node at the first location.

18. The system of claim 15, wherein identifying the first location comprises determining the ability of the control device to control the first node at the first location.

19. The system of claim 15, wherein communicating with the first node at the first location comprises controlling the first node at the first location using the mapped control functions.

20. The system of claim 19, wherein controlling the first node at the first location comprises controlling the first node over a wireless network.

21. The system of claim 20, wherein the wireless network is selected from the group consisting of: an infrared network, a ZigBee network, or a WiFi network.

22. A system configured for location based control of nodes at multiple locations, the system comprising:

a control system; and a control device that is in electronic communication with the control system, the control device comprising:

a processor;

memory in electronic communication with the processor; and instructions stored in the memory, the instructions upon being executed cause the processor to:

identify a first location by the control device, wherein the control device includes a control device key database having a first encryption key for communicating at the first location;

map by the control device a control function that is stored on the control device, wherein the mapping occurs based on the first location such that the control function, while the control device is in the first location, results in a first action being performed in relation to a first node, wherein the first node includes a node key database having a list of approved keys for communication with the first node, and wherein the node key database includes keys for more than one control device;

communicate with the first node at the first location, wherein communicating with the first node comprises sending the first encryption key from the control device key database to the first node to authenticate the control device with the location;

identify a second location by the control device;

map by the control device a control function based on the second location such that the control function, while the control device is in the second location, results in a second action being performed in relation to a second node, wherein the same control function performs a different action in the first location and the second location such that the first action is different from the second action; and communicate with the second node at the second location, wherein communicating with the second node comprises using a second encryption key to communicate with the second node at the second location.

23. The system of claim 22, wherein the control system further comprises a site controller, wherein the site controller comprises an embedded system that includes built-in audio ports, built-in video ports, and built-in infrared in and out ports and wherein the site controller does not require an external exclusive computer monitor for standard operation.

* * * * *